(12) United States Patent
Chen et al.

(10) Patent No.: US 8,792,410 B2
(45) Date of Patent: Jul. 29, 2014

(54) RELAY METHOD OF TRANSPORT BEARER, APPARATUS AND COMMUNICATION SYSTEM

(75) Inventors: Weimin Chen, Chengdu (CN); Gauquan Lin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 238 days.

(21) Appl. No.: 13/370,732

(22) Filed: Feb. 10, 2012

(65) Prior Publication Data
US 2012/0140697 A1    Jun. 7, 2012

Related U.S. Application Data

(63) Continuation of application No. PCT/CN2010/075665, filed on Aug. 3, 2010.

(30) Foreign Application Priority Data

Aug. 13, 2009    (CN) .......................... 2009 1 0163687

(51) Int. Cl.
*H04B 7/14*    (2006.01)
*H04W 28/06*    (2009.01)
*H04W 84/04*    (2009.01)

(52) U.S. Cl.
CPC ............ *H04W 28/06* (2013.01); *H04W 84/047* (2013.01)
USPC ....................................... 370/315

(58) Field of Classification Search
CPC ... H04W 88/04; H04W 28/06; H04W 28/065; H04W 84/047; H04W 92/02; H04B 7/14
USPC .................................................. 370/401, 315
See application file for complete search history.

(56) References Cited

U.S. PATENT DOCUMENTS 6,658,021 B1 * 12/2003 Bromley et al. .............. 370/466
7,170,869 B2    1/2007 Yang et al.
(Continued)

FOREIGN PATENT DOCUMENTS

CN    1275298 A    11/2000
CN    1697421 A    11/2005
(Continued)

OTHER PUBLICATIONS

First Chinese Office Action (including partial translation) issued in Chinese Application No. 200910163687.X, mailing date: Jul. 3, 2012, 7 pages.

(Continued)

*Primary Examiner* — Gary Mui
(74) *Attorney, Agent, or Firm* — Slater & Matsil, L.L.P.

(57) ABSTRACT

Embodiments of the present invention disclose a relay method of a transport bearer, an apparatus and a communication system. According to the technical solutions in the present invention, when receiving information encapsulated by a source device and sent by the source device, a relay base station first decapsulates the information, encapsulates the information again, and then sends the encapsulated information to a host device, thus ensuring that the information has only a layer of encapsulation in the transport procedure, so as to avoid a case that a high overhead caused by two layers of encapsulation occurs in the transport procedure. Compared with the prior art, the overhead in the transport procedure may be reduced, and the transport efficiency may be increased.

14 Claims, 10 Drawing Sheets

(56) References Cited

U.S. PATENT DOCUMENTS

| | | |
|---|---|---|
| 7,809,015 B1 | 10/2010 | Willis et al. |
| 2003/0142643 A1 | 7/2003 | Yang et al. |
| 2006/0014686 A1 | 1/2006 | Wonsey et al. |
| 2006/0146826 A1 | 7/2006 | Namihira |
| 2007/0268846 A1* | 11/2007 | Proctor et al. ............ 370/279 |
| 2008/0165776 A1 | 7/2008 | Tao et al. |
| 2008/0219203 A1 | 9/2008 | Chou et al. |
| 2009/0279701 A1* | 11/2009 | Moisand et al. ............ 380/270 |
| 2010/0014451 A1* | 1/2010 | Fujino ............ 370/315 |
| 2010/0309792 A1* | 12/2010 | Wang et al. ............ 370/246 |
| 2012/0051736 A1* | 3/2012 | Yan et al. ............ 398/18 |

FOREIGN PATENT DOCUMENTS

| | | |
|---|---|---|
| CN | 1722702 A | 1/2006 |
| EP | 1971092 A1 | 9/2008 |
| WO | 2009010850 A2 | 1/2009 |
| WO | 2009066899 A2 | 5/2009 |

OTHER PUBLICATIONS

European Communication enclosing extended European Search Report, issued in European Application No. 10807947.6-2142, dated: Jul. 6, 2012.

Menchaca-Mendez et al., "Scalable Multicast Routing in MANETs Using Sender-Initiated Multicast Meshes", 1-4244-2575, IEEE, Apr. 2008, 12 pages.

PCT International Search Report, issued in International Application No. PCT/CN2010/075665, date of mailing: Nov. 11, 2010, 4 pages.

PCT Written Opinion of the International Searching Authority, issued in International Application No. PCT/CN2010/075665, mailing date: Nov. 11, 2010, 5 pages.

* cited by examiner

RELAY METHOD OF TRANSPORT BEARER, APPARATUS AND COMMUNICATION SYSTEM

CROSS-REFERENCE TO RELATED APPLICATIONS

This application is a continuation of International Application No. PCT/CN2010/075665, filed on Aug. 3, 2010, which claims priority to Chinese Patent Application No. 200910163687.X, filed on Aug. 13, 2009, both of which are hereby incorporated by reference in their entireties.

FIELD OF THE INVENTION

The present invention relates to the field of communications technologies, and in particular, to a relay method of a transport bearer, an apparatus and a communication system.

BACKGROUND OF THE INVENTION

In a wireless communication system, in order to ensure normal receiving and sending of user data, a wireless air interface bearer generally needs to be set up between a UE and a base station, and a transport bearer is set up between the base station and a gateway; meanwhile, the wireless air interface bearer of the UE corresponds to the transport bearer from the base station to the gateway one by one, and for example, an identity (ID, Identity) of the wireless air interface bearer corresponds to an ID of the transport bearer one by one.

If in the data transfer procedure, the base station setting up the wireless air interface bearer with the UE is a self-backhauling base station or layer 3 relay (Layer 3 Relay, abbreviated as L3 Relay) (for convenience of description, both the self-backhauling base station and the L3 Relay are collectively referred to as a self-backhauling base station below), the self-backhauling base station or L3 Relay can only communicate with a corresponding gateway through a relay base station. If the gateway of the self-backhauling base station is different from that of the relay base station, the gateway of the relay base station must be further switched to the gateway of the self-backhauling base station, and for example, a transport bearer solution from the self-backhauling base station to the gateway of the self-backhauling base station may specifically be as follows:

(1) Uplink Signaling and Data

Signaling and data sent by the self-backhauling base station to the gateway of the self-backhauling base station are respectively encapsulated, a packet header 1 is added to the signaling, a packet header 2 is added to the data, and after the signaling and the data are sent to the relay base station, the relay base station encapsulates the signaling and the data again, and after a layer of a packet header 3 is added to an original packet, the packet is sent to the gateway of the relay base station; after receiving the packet, the gateway of the relay base station decapsulates the packet to obtain the packet header 3, and forwards the decapsulated packet to the gateway of the self-backhauling base station, and the gateway of the self-backhauling base station decapsulates the packet to obtain the packet header 1 and the packet header 2.

(2) Downlink Signaling and Data

Signaling and data sent by the gateway of the self-backhauling base station to the self-backhauling base station are respectively encapsulated, a packet header 1 is added to the signaling, a packet header 2 is added to the data, then the signaling and the data are sent to the gateway of the relay base station, the gateway of the relay base station encapsulates the signaling and the data again, and after a layer of a packet header 3 is added, the packet is sent to the relay base station; after receiving the packet, the relay base station decapsulates the packet to obtain the packet header 3, and forwards the decapsulated packet to the self-backhauling base station, and the self-backhauling base station decapsulates the packet to obtain the packet header 1 and the packet header 2.

In a process for researching and practicing the prior art, the inventor of the present invention finds that: Two layers of encapsulation occur in the transport procedure, so the overhead is relatively high.

SUMMARY OF THE INVENTION

Embodiments of the present invention provide a relay method of a transport bearer, an apparatus and a communication system, which may reduce the overhead in a transport procedure.

A relay method of a transport bearer includes:
receiving information encapsulated by a source device and sent by the source device;
decapsulating the received information encapsulated by the source device;
encapsulating the decapsulated information; and
sending the encapsulated information to a host device.

A relay base station includes:
a receiving unit, configured to receive information encapsulated by a source device and sent by the source device;
a decapsulating unit, configured to decapsulate the information encapsulated by the source device and received by the receiving unit;
an encapsulating unit, configured to encapsulate the information decapsulated by the decapsulating unit; and
a sending unit, configured to send the information encapsulated by the encapsulating unit to a host device.

A communication system includes:
a source device, configured to encapsulate information required to be sent to a host device and send the encapsulated information to a relay base station;
the relay base station, configured to receive the information encapsulated by the source device and sent by the source device, decapsulate the information encapsulated by the source device, encapsulate the decapsulated information, and send the encapsulated information to the host device; and
the host device, configured to receive the encapsulated information sent by the relay base station.

It should be noted that, the self-backhauling base station mentioned in the embodiments of the present invention further includes an L3 Relay, that is, for convenience of description, both the self-backhauling base station and the L3 Relay are collectively referred to as the self-backhauling base station in the embodiments of the present invention.

In the embodiments of the present invention, when receiving the information encapsulated by the source device and sent by the source device, the relay base station first decapsulates the information, encapsulates the information again, and then sends the encapsulated information to the host device, thus ensuring that the information has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased.

BRIEF DESCRIPTION OF THE DRAWINGS

To illustrate the technical solutions according to the embodiments of the present invention more clearly, accompanying drawings required for describing the embodiments are introduced briefly in the following. Apparently, the accompanying drawings in the following description are only some embodiments of the present invention, and persons of ordinary skill in the art may further obtain other drawings from the accompanying drawings without creative efforts.

DETAILED DESCRIPTION OF THE EMBODIMENTS

The technical solutions according to the embodiments of the present invention are clearly and completely described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

An embodiment of the present invention provides a relay method of a transport bearer. Embodiments of the present invention further provide a corresponding apparatus and a corresponding communication system, which are respectively illustrated in detail below.

Embodiment 1

This embodiment is described from the perspective of a relay base station.

Figure 1:
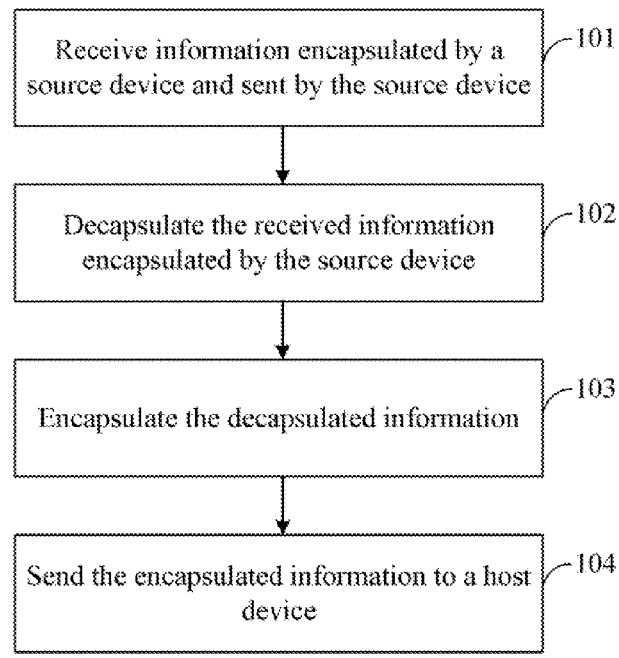
FIG. 1 is a flowchart of a method according to a first embodiment of the present invention.

A relay method of a transport bearer includes: receiving information encapsulated by a source device and sent by the source device; decapsulating the information encapsulated by the source device; encapsulating the decapsulated information; and sending the encapsulated information to a host device. As shown in FIG. 1, the specific process may be as follows:

101: Receive information encapsulated by a source device and sent by the source device.

The received information may be information of an uplink or may be information of a downlink, that is, the source device may be a self-backhauling base station, and correspondingly, the host device may be a gateway; or the source device may be a gateway, and correspondingly, the host device may be a self-backhauling base station; additionally, the information may be a signaling message, or may be data, and specifically may be as follows:

(1) Information of an uplink (that is, the source device is a self-backhauling base station, and the host device is a gateway):

Receiving information encapsulated by a self-backhauling base station and sent by the self-backhauling base station, for example:

Receiving a signaling message encapsulated by the self-backhauling base station and sent by the self-backhauling base station, where a source address of the signaling message encapsulated by the self-backhauling base station is a signaling bearer address of the self-backhauling base station, and a destination address is a signaling bearer address of a relay base station; or receiving data encapsulated by the self-backhauling base station and sent by the self-backhauling base station, where a source address of the data encapsulated by the self-backhauling base station is a data bearer address of the self-backhauling base station, and a destination address is a data bearer address of a relay base station; and (2) Information of a downlink (that is, the source device is a gateway, and the host device is a self-backhauling base station)

Receiving information encapsulated by a gateway and sent by the gateway, for example:

Receiving a signaling message encapsulated by the gateway and sent by the gateway, where the signaling message encapsulated by the gateway may carry a self-backhauling base station identity, so that subsequently a relay base station may encapsulate a parsed signaling message according to the self-backhauling base station identity, that is, the relay base station may find a corresponding self-backhauling base station according to the self-backhauling base station identity, thus obtaining relevant information such as a signaling bearer address of the self-backhauling base station, so that the relay base station may send the signaling message to the self-backhauling base station corresponding to the self-backhauling base station identity; additionally, a source address of the signaling message encapsulated by the gateway is a signaling bearer address of the gateway, and a destination address is a signaling bearer address of the relay base station; or receiving data encapsulated by the gateway and sent by the gateway, where a source address of the data encapsulated by the gateway is a data bearer address of the gateway, and a destination address is a data bearer address of a relay base station.

102: Decapsulate the received information encapsulated by the source device, which may specifically be as follows:

(1) Information of an Uplink:

Decapsulating the received information encapsulated by the self-backhauling base station, for example:

Decapsulating the received signaling message encapsulated by the self-backhauling base station, and parsing that the source address is the signaling bearer address of the self-backhauling base station, and the destination address is the signaling bearer address of the relay base station; or decapsulating the received data encapsulated by the self-backhauling base station, and parsing that the source address is the data bearer address of the self-backhauling base station, and the destination address is the data bearer address of the relay base station.

It should be noted that, if multiple gateways exist, and the received signaling message does not specify a gateway corresponding to the signaling message, the relay base station may further select a gateway for the self-backhauling base station, so that subsequently signaling bearer address replacement may be performed on the parsed signaling message according to the selected gateway; and, an identity denoting that relay processing is performed, and/or a self-backhauling base station identity may be added to the decapsulated signaling message, so that the selected gateway may process the received information according to these added identities, that is, the identity denoting that the relay processing is performed and/or the self-backhauling base station identity.

(2) Information of a Downlink

Decapsulating the received information encapsulated by the gateway, for example:

Decapsulating the received signaling message encapsulated by the gateway, and parsing that the source address of the information encapsulated by the gateway is the signaling bearer address of the gateway, and the destination address is the signaling bearer address of the relay base station; or decapsulating the received data encapsulated by the gateway, and parsing that the source address of the information encapsulated by the gateway is the data bearer address of the gateway, and the destination address is the data bearer address of the relay base station.

103: Encapsulate the decapsulated information. For example, signaling bearer address replacement is performed on the parsed signaling message, or data bearer address replacement is performed on the parsed data, which may specifically be as follows:

(1) Information of an Uplink

The source address of the decapsulated information is changed to an address of the relay base station, and the destination address is changed to an address of the gateway; for example:

A source address of the decapsulated signaling message is changed to a signaling bearer address of the relay base station, and a destination address is changed to a signaling bearer address of the gateway; or a source address of the decapsulated data is changed to a data bearer address of the relay base station, and a destination address is changed to a data bearer address of the gateway.

(2) Information of a Downlink

The source address of the decapsulated information is changed to an address of the relay base station, and the destination address is changed to an address of the self-backhauling base station; for example:

A source address of the decapsulated signaling message is changed to a signaling bearer address of the relay base station, and a destination address is changed to a signaling bearer address of the self-backhauling base station; if in step 101, the signaling message sent by the gateway to the relay base station carries a self-backhauling base station identity, in this case, the parsed signaling message may be encapsulated according to the self-backhauling base station identity, that is, a corresponding self-backhauling base station is found according to the self-backhauling base station identity, thus obtaining relevant information such as a signaling bearer address of the self-backhauling base station; or a source address of the decapsulated data is changed to a data bearer address of the relay base station, and a destination address is changed to a data bearer address of the self-backhauling base station.

It should be noted that, if in the previous information exchange procedure, the relay base station has set up an address mapping table, in this case the decapsulated information may be encapsulated according to the address mapping table, that is, replacement address items corresponding to the source address and the destination address that are in the received information may be determined by querying the address mapping table, for example, it is known by querying the address mapping table that, a replacement address corresponding to an source address is an address A of the relay base station, and therefore the source address is changed to the address A of the relay base station, and it is known by querying the address mapping table that, a replacement address corresponding to an destination address is an address B of the gateway, and therefore the destination address is changed to the address B of the gateway.

Additionally, in addition to performing the address (signaling bearer address or data bearer address) replacement, at this time, signaling identity replacement may be further performed on the parsed signaling message, or data tunnel identity replacement may be performed on the parsed data.

104: Send the encapsulated information to a host device. For example, the signaling message after the signaling bearer address replacement is sent to the host device, or the data after the data bearer address replacement is sent to the host device, which may specifically be as follows:

(1) Information of an Uplink

The information whose source address and destination address are changed is sent to the gateway; and (2) Information of a Downlink The information whose source address and destination address are changed is sent to the self-backhauling base station.

It should be noted that, in the information exchange procedure of the source device and the host device, the relay base station may further set up another mapping table according to content of the exchanged information, that is, content of the decapsulated information, for example, set up a signaling identity pair mapping table or tunnel mapping table, so that during subsequent transport, the decapsulated information may be encapsulated according to these mapping tables, for example, signaling identity replacement is performed on the parsed signaling message according to the signaling identity pair mapping table, or tunnel identity replacement is performed on the parsed data according to the tunnel mapping table; additionally, when the received information sent by the self-backhauling base station is a signaling message, after the signaling message is parsed, content of the signaling message may be further added to stored context information of the self-backhauling base station, that is, the content of the signaling message is reserved as one of contents of the context information of the self-backhauling base station. Similarly, when the received information sent by the gateway is a signaling message, after the signaling message is parsed, content of the signaling message may be further added to stored context information of the gateway, that is, the content of the signaling message is reserved as one of contents of the context information of the gateway corresponding to the self-backhauling base station.

It can be known from the foregoing that, in this embodiment, when receiving the information encapsulated by the source device and sent by the source device, the relay base station first decapsulates the information, encapsulates the information again, and then sends the encapsulated information to the host device, so that the relay function of the relay base station is achieved, and meanwhile it is ensured that the information has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station) is reduced in the transport procedure, a time delay may be reduced.

Embodiment 2

According to the method described in the first embodiment, in this embodiment of the present invention, a long term evolution (LTE, Long Term Evolution) system is taken as an example to further perform illustration in detail.

Figure 2:
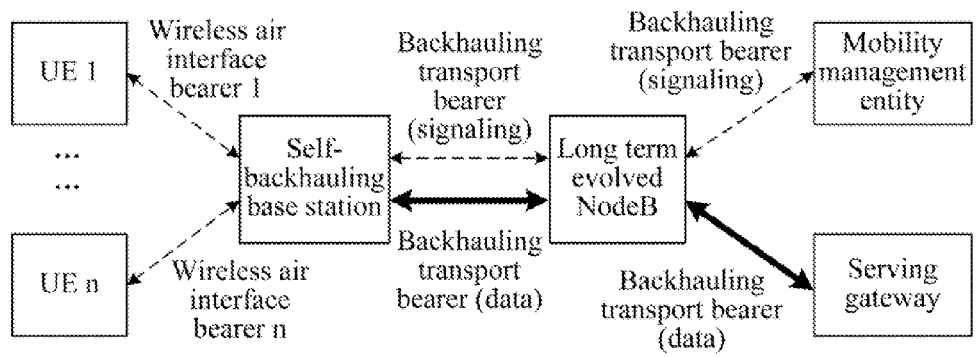
FIG. 2 is a schematic diagram of an LTE system according to an embodiment of the present invention.

Reference may be made to FIG. 2 for a schematic diagram of the LTE system, where a long term evolved NodeB (eNB, E-UTRAN Node B, abbreviated as an evolved NodeB below) is a relay base station, a mobility management entity (MME, Mobility Management Entity) is a gateway corresponding to signaling message transport, and a serving gateway (S-GW, Serving-Gateway) is a gateway corresponding to data transport. A UE (User Equipment, abbreviated as a UE) interacts with a self-backhauling base station through a wireless air interface bearer. Firstly, a relay function of a transport bearer needs to be added to the evolved NodeB, and may be abbreviated as an "S1 Relay" function, and the function includes:

The evolved NodeB provides a relay function for a signaling interface between the self-backhauling base station and the MME, and the evolved NodeB sets up two segments of transport bearers between the evolved NodeB and the self-backhauling base station, and between the evolved NodeB and the MME, that is, two segments of backhauling transport bearers of a signaling message in FIG. 2, so as to ensure normal signaling message interaction between the self-backhauling base station and the MME;

the evolved NodeB provides a relay function for data transport between the self-backhauling base station and the S-GW, and the evolved NodeB sets up two segments of transport bearers (that is, two segments of backhauling transport bearers of data in FIG. 2) between the evolved NodeB and the self-backhauling base station, and between the evolved NodeB and the S-GW, for example, sets up two segments of packet tunneling protocol (GTP, GPRS Tunneling Protocol) tunnels, and maintains a correspondent relation of these two segments of transport bearers.

It can be known from the first embodiment that, the information transferred in the transport bearer may be a signaling message, and may also be data, and therefore, for better description, the following several embodiments are respectively illustrated by taking signaling information and data as an example. In this embodiment, interaction of setting up a signaling message "S1 Setup" of an S1 interface (setting up an S1 interface) in the LTE system is taken as an example for illustration.

Figure 3:
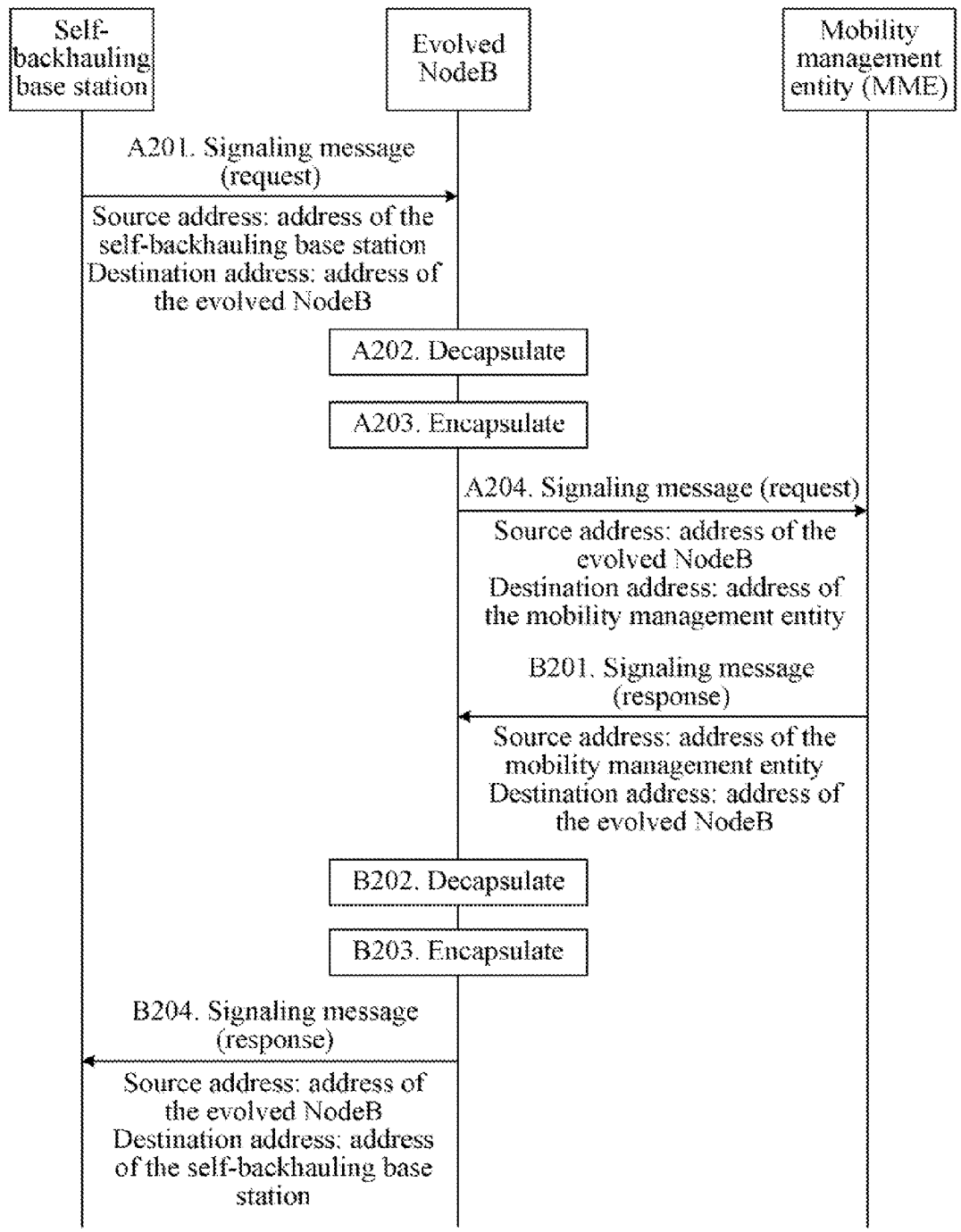
FIG. 3 is a flowchart of a method according to a second embodiment of the present invention.

Signaling message interaction includes both an uplink direction and a downlink direction, where processing in both the uplink direction and the downlink direction may be independently performed; referring to FIG. 3, the specific process may be as follows:

(1) Uplink direction, that is, a direction from the self-backhauling base station to the MME, in this case, the source device is the self-backhauling base station, and the host device is the MME;

A201: The self-backhauling base station encapsulates content of a signaling message S1 Setup request message, where a destination address is filled with an address of the evolved NodeB, and a source address is its own address (that is, an address of the self-backhauling base station), and then sends the encapsulated signaling message to the evolved NodeB;

A202: After receiving the signaling message S1 Setup request message, the evolved NodeB decapsulates the signaling message S1 Setup request message, and parses that the destination address of the received signaling message S1 Setup request message is an address of the evolved NodeB, and the source address is the address of the self-backhauling base station;

It should be noted that, the evolved NodeB may parse the signaling message S1 Setup request message, and reserve content of the signaling message S1 Setup request message as one of contents of context information of the self-backhauling base station.

A203: Encapsulate the decapsulated signaling message S1 Setup request message, change the destination address of the signaling message S1 Setup request message to an address of the MME, and change the source address to its own address, that is, an address of the evolved NodeB;

If it is initial interaction, the evolved NodeB may further select a proper MME for the self-backhauling base station, and make a record, for convenience of subsequent signaling message interaction;

Additionally, the evolved NodeB may further add an identity denoting that relay processing is performed, and/or add a self-backhauling base station identity to the content of the signaling message provided for the MME, so that the MME may process the received signaling message according to the identity denoting that the relay processing is performed and the self-backhauling base station identity, where the self-backhauling base station identity may be an Internet protocol (IP, Internet Protocol) address of the self-backhauling base station, or an equipment identity (ID, IDentity) of the self-backhauling base station or an equipment name (name) of the self-backhauling base station.

A204: The eNB sends the encapsulated signaling message S1 Setup request message to the MME, so that the MME processes the signaling message.

(2) Downlink direction, that is, a direction from the MME to the self-backhauling base station, in this case, the source device is the MME, and the host device is the self-backhauling base station;

B201: The MME encapsulates content of a signaling message S1 Setup response message, where a destination address is filled with an address of the evolved NodeB, and a source address is its own address (that is, an address of the MME), and then sends the encapsulated signaling message S1 Setup response message;

The MME may carry the self-backhauling base station identity in the signaling message S1 Setup response message, for example, an IP address, an equipment ID, an equipment name, so that the evolved NodeB may know which self-backhauling base station is a receiver of the signaling message, that is, after receiving the signaling message, the evolved NodeB may send the re-encapsulated signaling message to the self-backhauling base station corresponding to the self-backhauling base station identity;

B202: After receiving the signaling message S1 Setup response message, the evolved NodeB decapsulates the signaling message S1 Setup response message, and parses that the destination address of the signaling message S1 Setup is the address of the evolved NodeB, and the source address is the address of the MME;

Moreover, the evolved NodeB may further parse the signaling message, and reserve content of the signaling message as one of contents of the context information of the MME corresponding to the self-backhauling base station;

B203: The evolved NodeB encapsulates the decapsulated signaling message S1 Setup response message, changes the destination address to an address of the self-backhauling base station, and changes the source address to its own address, that is, an address of the evolved NodeB;

B204: The evolved NodeB sends the encapsulated signaling message S1 Setup response message to the self-backhauling base station, so that the self-backhauling base station processes the signaling message S1 Setup response message.

It should be noted that, in the information exchange procedure of the source device and the host device, the relay base station may further set up a mapping table according to content of the exchanged signaling message, that is, content of the decapsulated signaling message, for example, set up a signaling identity pair mapping table, so that during subsequent transport, the decapsulated signaling message may be encapsulated according to the mapping table.

In view of that entities such as the self-backhauling base station, the evolved NodeB and the MME may include multiple addresses, therefore, it should be noted that, an address in the foregoing process mainly refers to a bearer address used to transport a signaling message, that is, a signaling address.

Figure 4:
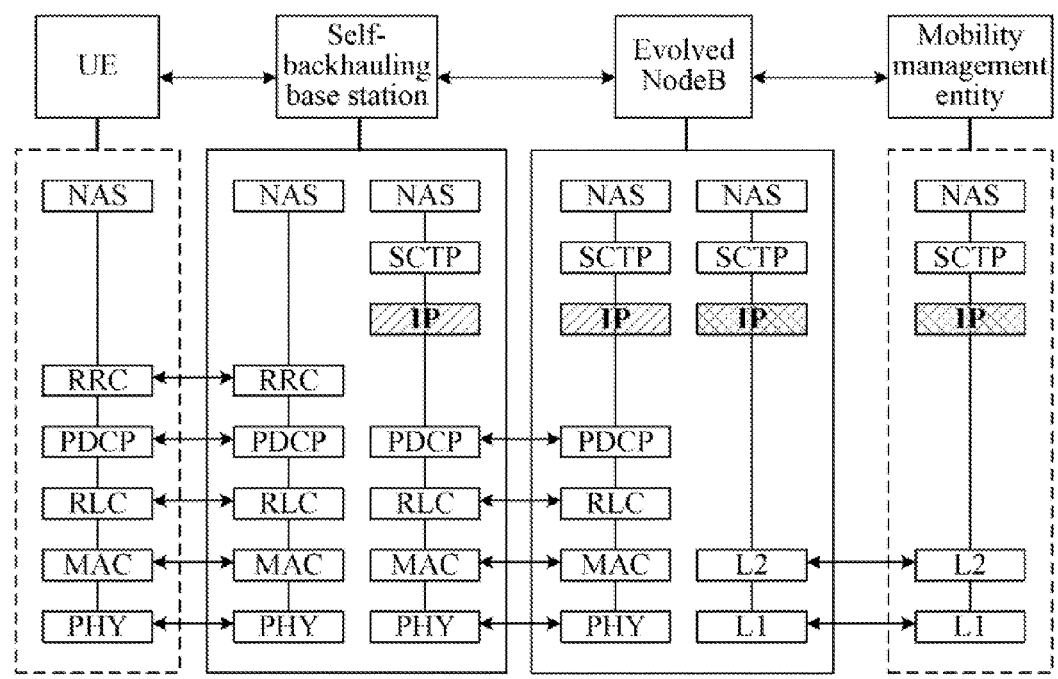
FIG. 4 is a schematic diagram of a protocol stack corresponding to the method according to the second embodiment of the present invention.

Reference may be made to FIG. 4 for a protocol stack corresponding to the foregoing method, the IP protocol is taken as an example in the drawing, a source address and a destination address of a transmission protocol bearer address between the self-backhauling base station and the evolved NodeB are denoted with diagonal shade, and a source address and a destination address of a transmission protocol bearer address between the evolved NodeB and the MME are denoted with mesh shade, where the non access stratum (NAS, Non-Access-Stratum), the stream control transmission protocol (SCTP, Stream Control Transmission Protocol), the radio resource control (RRC, Radio Resource Control), the packet data convergence protocol (PDCP, Packet Data Convergence Protocol), the radio link control layer (RLC, Radio Link Control), the media access control layer (MAC, Media Access Control), the physical layer (PHY, Physical Layer), the layer 2 (L2, Layer 2) and the layer 1 (L1, Layer 1) are protocols of other layers; because modification of these protocol layer solutions is not involved in solutions according to the embodiments of the present invention, and is not described in detail here; additionally, it should be noted that for simplicity and convenience of drawing, protocols in the drawing are all denoted with English abbreviation.

It can be seen that, through processing of the foregoing method, the source address and the destination address of the transmission protocol bearer address between the self-backhauling base station and the evolved NodeB, and the source address and the destination address of the transmission protocol bearer address between the evolved NodeB and the MME are different, but, only a layer of a protocol header may be ensured, thus avoiding a case of two layers of encapsulation in the prior art, and compared with the prior art, the overhead in the signaling message transport procedure may be greatly reduced, and the transport efficiency may be increased. Furthermore, because processing of a node (the gateway of the relay base station) is reduced in the transport procedure, a time delay may be reduced.

Embodiment 3

In the second embodiment, interaction of a signaling message "S1 Setup" is taken as an example for description; because the interaction of this signaling message is unrelated to a UE, so in order to better illustrate the embodiment of the present invention, in this embodiment, signaling message interaction related to a UE is taken as an example for detailed description below.

In the signaling message interaction procedure related to the UE, in order to identify different UEs, a pair of signaling identities needs to be generated, and this pair of signaling identities is carried in the signaling message interaction procedure. For convenience of description, in the embodiment of the present invention, this pair of signaling identities is named as an eNB UE S1AP ID and an MME UE S1AP ID, and for convenience of description, in the following embodiment, different subscripts are added to the signaling identities according to difference between devices generating this pair of signaling identities. For example, if this pair of signaling identities is generated by an eNB, this pair of signaling identities is named as an eNB UE S1AP $ID_{eNB}$ and an MME UE S1AP $ID_{eNB}$. It should be noted that, for convenience of description, in this embodiment, a subscript of a signaling identity generated by a self-backhauling base station is denoted with "X", for example, an eNB UE S1AP $ID_X$.

Figure 5:
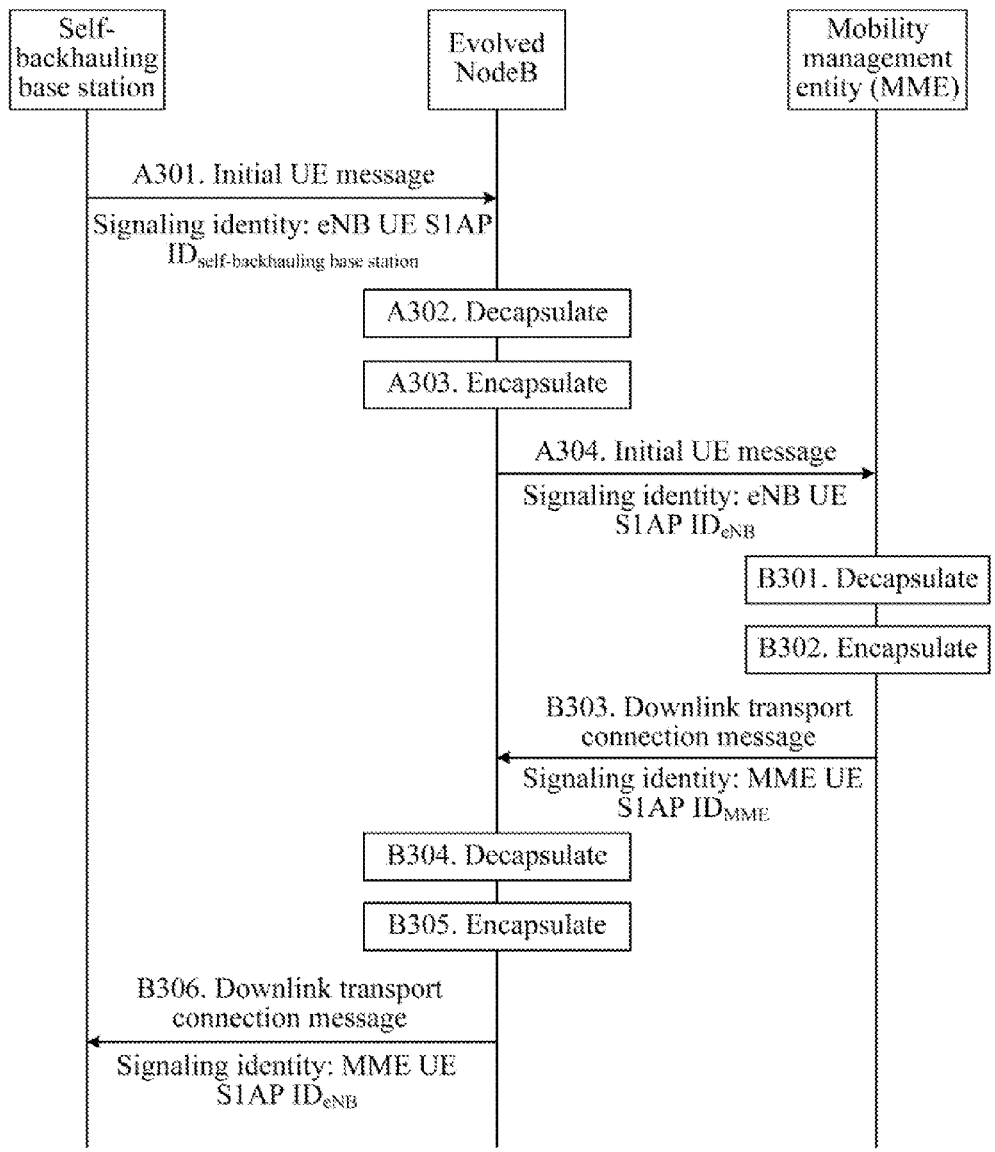
FIG. 5 is a flowchart of a method according to a third embodiment of the present invention.

Similar to the second embodiment, the signaling message interaction process includes both an uplink direction and a downlink direction, where processing processes in both the uplink direction and the downlink direction may be independently performed; referring to FIG. 5, the specific processes may be as follows:

(1) Uplink direction, that is, a direction from a self-backhauling base station to an MME, in this case, a source device is the self-backhauling base station, and a host device is the MME;

A301: Assume that the self-backhauling base station needs to set up a signaling connection for a UE, and therefore, the self-backhauling base station generates a signaling identity "eNB UE S1AP $ID_X$" for the UE, the eNB UE S1AP $ID_X$ is encapsulated in a signaling message, for example, an initial UE message, and then is sent to an evolved NodeB:

A302: The evolved NodeB decapsulates the signaling message INITIAL UE MESSAGE, and records the signaling identity eNB UE S1AP $ID_X$ carried in the INITIAL UE MESSAGE;

A303: The evolved NodeB generates a signaling identity "eNB UE S1AP $ID_{eNB}$" for the UE, and encapsulates the decapsulated INITIAL UE MESSAGE, and specifically, an original signaling identity may be replaced with the generated signaling identity, that is, the eNB UE S1AP $ID_X$ is changed to the eNB UE S1AP $ID_{eNB}$;

A304: The evolved NodeB sends the INITIAL UE MESSAGE carrying the eNB UE S1AP $ID_{eNB}$ signaling identity to the MME, and step B301 is executed:

(2) Downlink direction, that is, a direction from the MME to the self-backhauling base station, in this case, the source device is the MME, and the host device is the self-backhauling base station;

B301: After receiving the signaling message INITIAL UE MESSAGE sent by the evolved NodeB, the MME parses the signaling message, and records signaling identity eNB UE S1AP $ID_{eNB}$ carried in the INITIAL UE MESSAGE;

B302: The MME generates a signaling identity MME UE S1AP $ID_{MME}$ for the UE; and encapsulates the parsed signaling message.

B303: The MME sends a downlink transport connection message (DOWNLINK NAS TRANSPORT) to the evolved NodeB, where the DOWNLINK NAS TRANSPORT carries the signaling identity MME UE S1AP $ID_{MME}$;

B304: After receiving the signaling message DOWNLINK NAS TRANSPORT sent by the MME, the evolved NodeB parses the signaling message, and records the signaling identity MME UE S1AP ID$_{MME}$ carried in the signaling message, and for example, the signaling identity MME UE S1AP ID$_{MME}$ may be recorded in a signaling identity pair mapping table, referring to the following table 1;

B305: The evolved NodeB generates a signaling identity MME UE S1AP ID$_{eNB}$ for the UE, and then encapsulates the parsed signaling message, and specifically the signaling identity MME UE S1AP ID$_{MME}$ in the signaling message may be replaced with the MME UE S1AP ID$_{eNB}$;

B306: The evolved NodeB sends the encapsulated signaling message, that is, the DOWNLINK NAS TRANSPORT carrying the signaling identity MME UE S1AP ID$_{eNB}$ to the self-backhauling base station;

After receiving the signaling message DOWNLINK NAS TRANSPORT carrying the signaling identity MME UE S1AP ID$_{eNB}$, the self-backhauling base station parses the signaling message, and records the sent signaling identity MME UE S1AP ID$_{eNB}$;

It should be noted that, when performing signaling message relay processing, the evolved NodeB may set up a corresponding signaling identity pair mapping table according to the content of the signaling message exchanged between the self-backhauling base station and the MME, so that in subsequent signaling message interaction, the evolved NodeB may encapsulate the received signaling message according to the mapping table; referring to table 1, the signaling identity pair mapping table may specifically be as follows;

TABLE 1

| Signaling identity pair mapping table set up by the evolved NodeB | |
|---|---|
| Received | Replaced with |
| eNB UE S1AP ID$_X$ | eNB UE S1AP ID$_{eNB}$ |
| MME UE S1AP ID$_{eNB}$ | MME UE S1AP ID$_{MME}$ |
| eNB UE S1AP ID$_{eNB}$ | eNB UE S1AP ID$_X$ |
| MME UE S1AP ID$_{MME}$ | MME UE S1AP ID$_{eNB}$ |

Through the foregoing processing, it can be seen that, the UE is identified through this pair of signaling identities, namely, the eNB UE S1AP ID$_X$ and the MME UE S1AP ID$_{eNB}$, between the self-backhauling base station and the evolved NodeB, while the UE is identified through this pair of signaling identities, namely, the eNB UE S1AP ID$_{eNB}$ and the MME UE S1AP ID$_{MME}$, between the evolved NodeB and the MME. A mapping relation between these two pairs of signaling identity pairs (referring to table 1) is completed by the evolved NodeB, and in this way, the evolved NodeB completes the relay of two segments of signaling message hearers.

It should be noted that, specific content of signaling is not involved in the methods provided in this embodiment and the second embodiment, and therefore, the methods are also applicable to other signaling interchange processes.

It can be known from the foregoing that, in this embodiment, when receiving the signaling message encapsulated by the source device and sent by the source device, the relay base station first decapsulates the signaling message, encapsulates the signaling message again, and then sends the encapsulated signaling message to the host device, thus achieving the relay function of the relay base station, and ensuring that the signaling message has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station) is reduced in the transport procedure, a time delay may be reduced.

Embodiment 4

Different from the second embodiment and the third embodiment, in this embodiment, data transport in a GTP tunnel in an LTE system is taken as an example for illustration.

Figure 6:
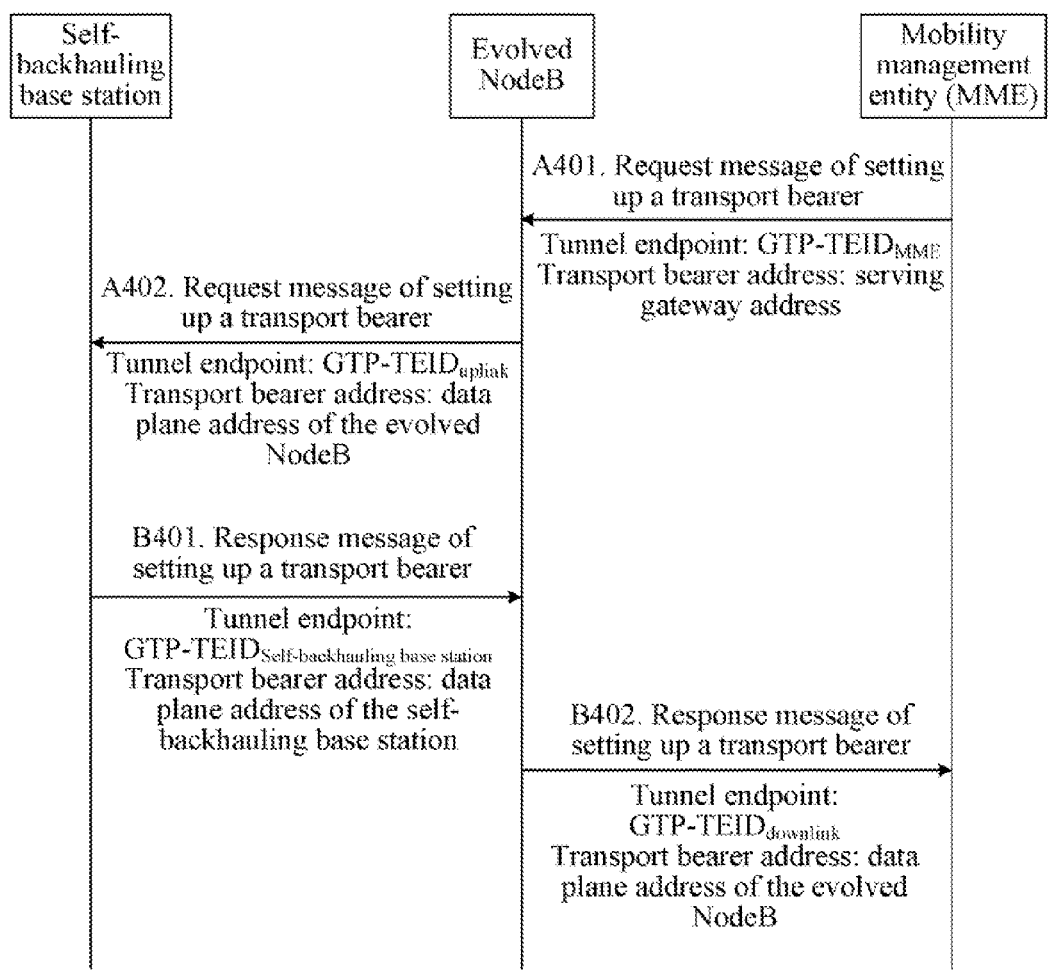
FIG. 6 is a flowchart of a method for setting up a GTP tunnel according to a fourth embodiment of the present invention.

Firstly, before data is transported, data transport bearers need to be set up respectively between a self-backhauling base station and an evolved NodeB, and between the evolved NodeB and an S-GW, that is, totally two segments of data transport bearers need to be set up; for convenience of description, in the following embodiments, a data transport bearer set up as a GTP tunnel is taken as an example for illustration, and specifically the setup may be performed through a signaling message Initial Context Setup or E-RAB Setup of a transport bearer involved in the LTE system; as shown in FIG. 6, a brief process about setting up a GTP tunnel may be as follows:

(1) Setup of an Uplink GTP Tunnel

A401: An MME generates a tunnel endpoint GTP-TEID$_{MME}$, and selects an "S-GW address" as a transport bearer address of a gateway, and send the GTP-TEID$_{MME}$ and the S-GW address to an evolved NodeB through a request message about setting up a transport bearer.

A402: The evolved NodeB parses the request message about setting up a transport bearer, generates a tunnel endpoint GTP-TEID$_{uplink}$, and replaces the tunnel endpoint GTP-TEID$_{MME}$ in the original request message with the newly-generated tunnel endpoint GTP-TEID$_{uplink}$, and meanwhile, replaces the transport bearer address: "an address of an S-GW" with "a data plane address of the evolved NodeB", and then sends the GTP-TEID$_{uplink}$ and the data plane address of the evolved NodeB to a self-backhauling base station through the request message about setting up a transport bearer;

(2) Setup of a Downlink GTP Tunnel

B401: The self-backhauling base station generates a tunnel endpoint GTP-TEID$_X$, selects "a data plane address of the self-backhauling base station" as a transport bearer address, and send the GTP-TEID$_X$ and the data plane address of the self-backhauling base station to the evolved NodeB through a response message about setting up a transport bearer;

B402: The evolved NodeB parses the received response message about setting up a transport bearer, generates a tunnel endpoint GTP-TEID$_{downlink}$, replaces the tunnel endpoint GTP-TEID$_X$ in the original signaling message with the newly-generated tunnel endpoint GTP-TEID$_{downlink}$, and meanwhile, replaces the transport bearer address: "the data plane address of the self-backhauling base station" with "the data plane address of the evolved NodeB", and sends the GTP-TEID$_{downlink}$ and the data plane address of the evolved NodeB to the MME through the response message about setting up a transport bearer;

In the GTP tunnel setup procedure, the evolved NodeB may set up a tunnel mapping table, which may specifically refer to table 2;

TABLE 2

Tunnel mapping table set up by an eNB

| Received | Sending | Destination transport bearer address |
|---|---|---|
| $GTP\text{-}TEID_{downlink}$ | $GTP\text{-}TEID_X$ | Data plane address of a self-backhauling base station |
| $GTP\text{-}TEID_{uplink}$ | $GTP\text{-}TEID_{MME}$ | S-GW data plane address |

It should be noted that, the foregoing process is similar to those in the second embodiment and the third embodiment, and only the content of the signaling message is different from those in the second embodiment and the third embodiment; for convenience of description, merely brief illustration is made here, and reference may be to the second embodiment and the third embodiment for details. Additionally, it should be noted that, in addition to adopting the methods provided in the embodiments of the present invention, a GTP tunnel may further be set up by adopting other methods, that is, the foregoing process pays attention to implementing the content of the signaling message instead of paying attention to how to implement the transport of the signaling message. The signaling message is used for implementing the setup of a data transport bearer, so an address involved in the signaling content is mainly directed to an address used to transport data, that is, a data plane address; meanwhile, the foregoing address takes an IP address as an example, and is not limited to an IPv4 address or IPv6 address.

Figure 7:
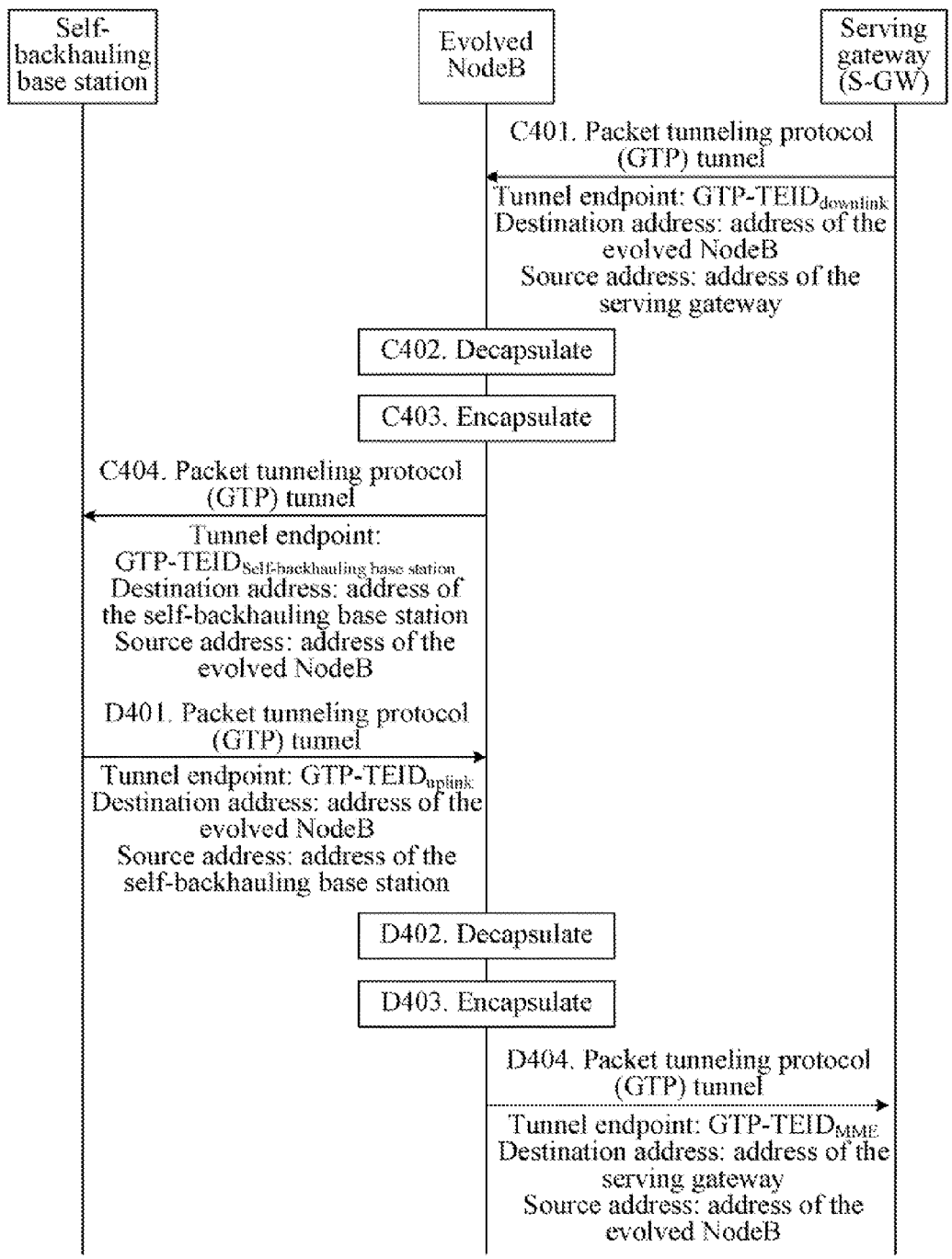
FIG. 7 is a flowchart of a relay method of a data transport bearer according to the fourth embodiment of the present invention.

After a GTP tunnel is set up, data may be transported through these two segments of GTP tunnels. Referring to FIG. 7, the specific processes may be as follows:

(1) Downlink Data Transport

C401: The S-GW encapsulates data, and specifically downlink data may be encapsulated in a GTP tunnel whose destination tunnel endpoint is the $GTP\text{-}TEID_{downlink}$, the destination address is the evolved NodeB, the source address is the S-GW, and then the downlink data is transferred to the evolved NodeB through the GTP tunnel;

C402: After receiving the encapsulated downlink data, the evolved NodeB decapsulates the downlink data encapsulated in the GTP tunnel of the $GTP\text{-}TEID_{downlink}$;

B403: The evolved NodeB re-encapsulates the decapsulated downlink data according to a tunnel mapping relation, and specifically the decapsulated downlink data may be encapsulated in a GTP tunnel whose destination tunnel endpoint is the $GTP\text{-}TEID_X$, the destination address is the self-backhauling base station, and the source address is the evolved NodeB;

C404: The evolved NodeB transfers the encapsulated downlink data to the self-backhauling base station through the GTP tunnel;

After receiving the encapsulated downlink data, the self-backhauling base station parses the downlink data encapsulated in the GTP tunnel of the $GTP\text{-}TEID_X$, and sends the parsed data to the UE through an air interface according to a downlink air interface RAB corresponding to the $GTP\text{-}TEID_X$.

(2) Uplink Data Transport

The UE sends uplink data to the self-backhauling base station through an air interface radio access bearer (RAB, Radio Access Bearer);

D401: The self-backhauling base station encapsulates, according to the $GTP\text{-}TEID_{uplink}$ tunnel corresponding to the uplink air interface RAB, the received uplink data in a GTP tunnel whose destination tunnel endpoint is the $GTP\text{-}TEID_{uplink}$, the destination address is the eNB, and the source address is the self-backhauling base station;

D402: After receiving the encapsulated uplink data, the evolved NodeB decapsulates the uplink data encapsulated in the GTP tunnel of the $GTP\text{-}TEID_{uplink}$;

D403: The evolved NodeB re-encapsulates the decapsulated uplink data according to a tunnel mapping relation, and specifically the parsed uplink data may be re-encapsulated in a GTP tunnel whose destination endpoint is the $GTP\text{-}TEID_{MME}$, the destination address is the S-GW, and the source address is the evolved NodeB;

D404: The evolved NodeB transfers the encapsulated uplink data to the S-GW through the GTP tunnel;

After receiving the encapsulated uplink data, the S-GW parses the uplink data encapsulated in the GTP tunnel of the $GTP\text{-}TEID_{MME}$, and sends the parsed uplink data to a node at a next level.

In view of that entities such as the self-backhauling base station, the evolved NodeB and the MME may include multiple addresses, therefore, it should be noted that, an address in the foregoing process mainly refers to an address used to transport data, that is, a data plane address. The foregoing address takes an IP address as an example, and is not limited to an IPv4 address or IPv6 address.

Figure 8:
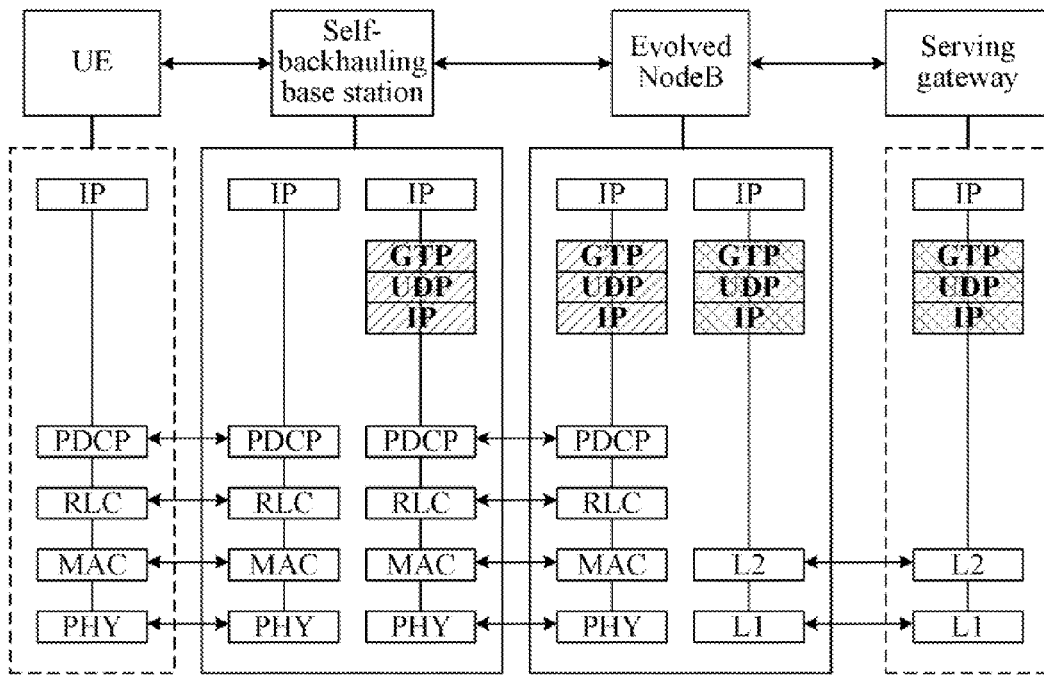
FIG. 8 is a schematic diagram of a protocol stack corresponding to the method according to the fourth embodiment of the present invention.

Reference may be made to FIG. 8 for a protocol stack corresponding to the foregoing method, the GTP, the user datagram protocol (UDP, User Datagram Protocol) and the IP protocol are taken as an example in the drawing, a transmission protocol between the self-backhauling base station and the evolved NodeB is denoted with diagonal shade, and a transmission protocol between the evolved NodeB and the S-GW is denoted with mesh shade, where the PDCP, the RLC, the MAC, the PHY, the L2 and the L1 are protocols of other layers, because modification of these protocol layer solutions is not involved in solutions according to the embodiments of the present invention, and is not described in detail here; additionally, it should be noted that for simplicity and convenience of drawing, protocols in the drawing are all denoted with English abbreviation.

The GTP tunnel between the self-backhauling base station and the evolved NodeB is different from the GTP tunnel between the evolved NodeB and the MME; for example, the TEID of GTP tunnel, and the source address and the destination address of the IP address are different.

It can be known from the foregoing that, in this embodiment, when receiving the data encapsulated by the source device and sent by the source device, the relay base station, that is, the evolved NodeB first decapsulates the data, encapsulates the data again, and then sends the encapsulated data to the host device, thus achieving the relay function of the relay base station, and ensuring that the data has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station) is reduced in the transport procedure, a time delay may be reduced.

Embodiment 5

In the case that a self-backhauling base station is movable, the self-backhauling base station may be handed over between different relay base stations (in this embodiment, the relay base station takes an evolved NodeB as an example), and therefore, in this embodiment, a case that the self-backhauling base station is handed over between different evolved NodeBs is illustrated (in this embodiment, a transport bearer being a GTP tunnel is further taken as an example for illustration).

Figure 9:
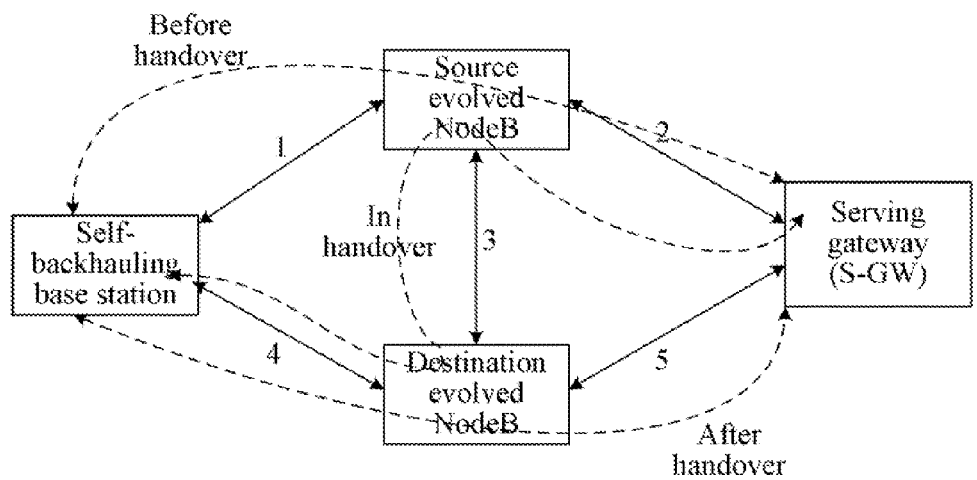
FIG. 9 is a schematic diagram of a scenario of handing over an evolved NodeB according to an embodiment of the present invention.

Referring to FIG. 9, assume that a relay base station is handed over from a source evolved NodeB to a destination evolved NodeB because of movement of a sell-backhauling base station:

Before handover, the self-backhauling base station performs relay through the source evolved NodeB, and interacts with an S-GW. The source evolved NodeB specifically maintains a segment 1 GTP tunnel and a segment 2 GTP tunnel, and sets up a mapping relation, that is, sets up a tunnel mapping table between the self-backhauling base station and the gateway;

In handover, the self-backhauling base station performs relay through the destination evolved NodeB and the source evolved NodeB, and interacts with the S-GW. The destination evolved NodeB specifically maintains a segment 4 GTP tunnel and a segment 3 GTP tunnel, and sets up a mapping relation, that is, sets up a tunnel mapping table between the self-backhauling base station and the source relay base station; the source evolved NodeB specifically maintains the segment 3 GTP tunnel and the segment 2 GTP tunnel, and sets up a mapping relation, that is, sets up a tunnel mapping table between the destination relay base station and the gateway; it should be noted that, in this case, with respect to an original relay base station, the destination relay base station may be equivalent to the self-backhauling base station;

After handover, the self-backhauling base station performs relay through the destination evolved NodeB, and interacts with the S-GW. In this case, the destination evolved NodeB specifically maintains the segment 4 GTP tunnel and a segment 5 GTP tunnel, and sets up a mapping relation, that is, sets up a tunnel mapping table between the self-backhauling base station and the gateway. It should be noted that, uplink and downlink tunnels are not distinguished for the foregoing tunnels 1, 2, 3, 4 and 5; during specific implementation, the uplink tunnel and the downlink tunnel separately perform processing according to methods described in previous embodiments, which is not repeatedly described here.

The relay of the transport bearer of the data "before handover" and "after handover" is the same as that in the fourth embodiment, and the relay of the transport bearer of signaling also only involves stages of "before handover" and "after handover", and is similar to those in the second embodiment and the third embodiment, so the relay is not repeatedly described here; for convenience of description, in this embodiment, only the case of "in handover" is illustrated.

Firstly, the source relay base station may send, to the destination relay base station, a handover request about handover from the source relay base station to the destination relay base station, where the handover request carries an address of the source relay base station and a gateway address; after receiving the handover request, the destination relay base station returns a response message to the source relay base station, and when the source relay base station receives the response message denoting consent, where the response message denoting consent is returned by the destination relay base station and carries the address of the destination relay base station, and after the information encapsulated by the gateway is parsed, the source address of the parsed information is changed to the address of the source relay base station, the destination address is changed to the address of the destination relay base station, and then the changed information is sent to the destination relay base station, so that the destination relay base station relays the changed information to the self-backhauling base station. The following takes an example for illustration.

Assume that the record in the tunnel mapping table of the source evolved NodeB is as shown in table 3;

TABLE 3

| GTP tunnel | Destination transport bearer address |
| --- | --- |
| 2->1 | Data plane address of a self-backhauling base station |
| 1->2 | Data plane address of an S-GW |

Where 2->1 denotes from the GTP tunnel 2 to the GTP tunnel 1, and 1->2 denotes from the GTP tunnel 1 to the GTP tunnel 2.

Figure 10:
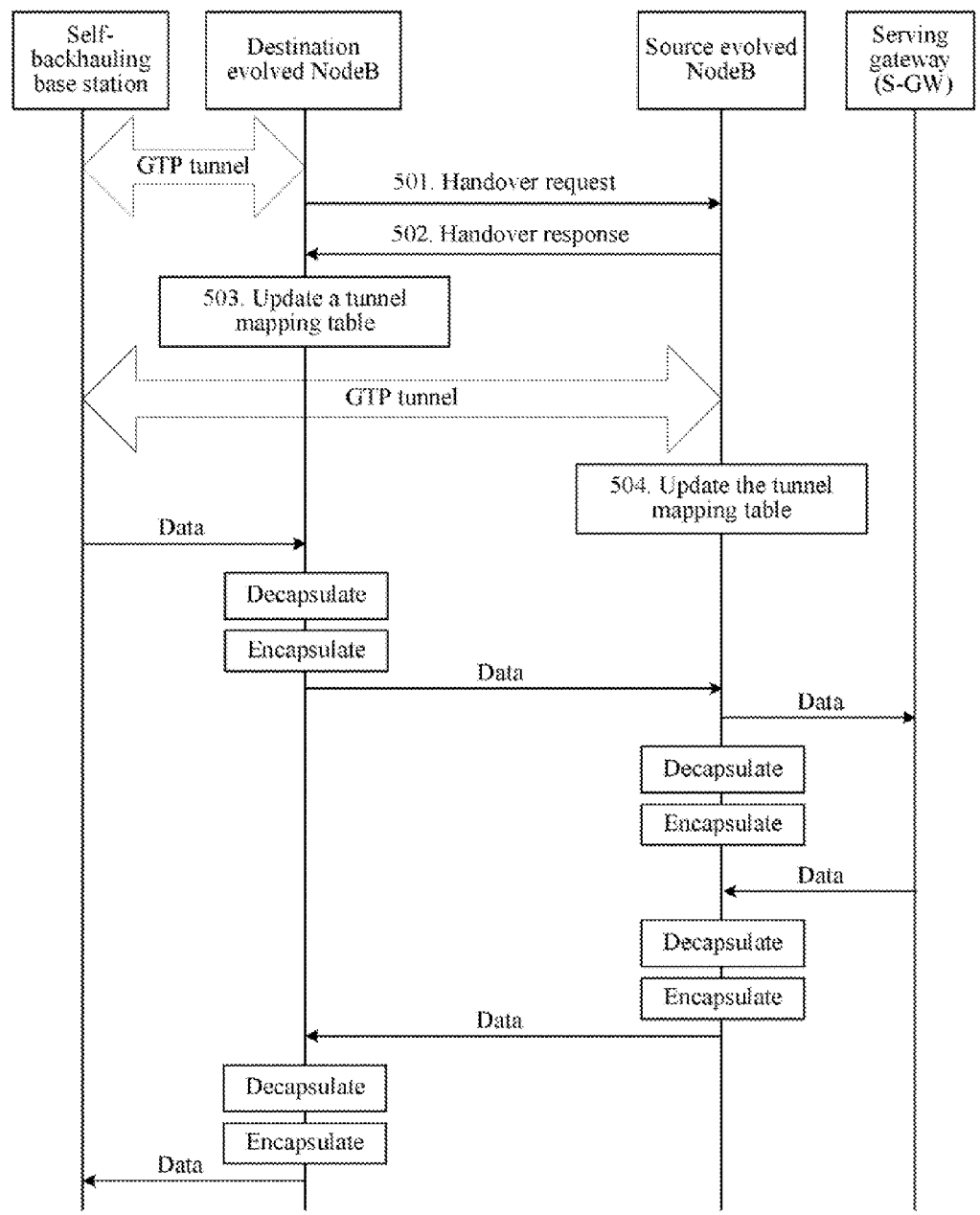
FIG. 10 is a flowchart of a method according to a fifth embodiment of the present invention.

Referring to FIG. 10, the process may be as follows:

501: The source evolved NodeB initiates a handover request to the destination evolved NodeB, and meanwhile may carry a transport bearer setup request, where the handover request includes a tunnel endpoint identity (TEID) generated by the source evolved NodeB and/or the data plane address of the source evolved NodeB.

Besides being directly sent to the destination evolved NodeB, the handover request may further be indirectly sent to the destination evolved NodeB, and for example, the source evolved NodeB sends the handover request to the MME, and then the MME sends the handover request to the destination evolved NodeB;

502: The destination evolved NodeB initiates a handover response to the source evolved NodeB. It should be noted that, here, the handover response refers to a handover response denoting success (or consent to handover), if in step 501, a transport bearer setup request is further carried simultaneously, in this case, a transport bearer setup response may be further carried, and the handover response includes the tunnel endpoint identity (TEID) generated by the destination evolved NodeB and/or the data plane address of the destination evolved NodeB;

Besides being directly sent to the source evolved NodeB, the handover response may further be indirectly sent to the source evolved NodeB, and for example, the destination evolved NodeB sends the handover request to the MME, and then the MME sends the handover request to the source evolved NodeB;

503: After the source evolved NodeB receives the handover response denoting success, where the handover response denoting success is sent by the destination evolved NodeB to the source evolved NodeB, the setup of the GTP tunnel 3 is completed, and the source evolved NodeB updates the tunnel mapping table, 2->1 is updated as 2->3, the destination transport bearer address is updated as the data plane address of the destination evolved NodeB; 1->2 is updated as 3->2, and the destination transport bearer address is invariable, and is the data plane address of the S-GW. Refer to table 4;

TABLE 4

| GTP tunnel | Destination transport bearer address |
| --- | --- |
| 2->3 | Data plane address of a destination evolved NodeB |
| 3->2 | Data plane address of an S-GW |

Where 2->3 denotes from the GTP tunnel 2 to the GTP tunnel 3, and 3->2 denotes from the GTP tunnel 3 to the GTP tunnel 2.

504: The self-backhauling base station accesses the destination evolved NodeB, and adopts a method similar to that in steps 501 and 502, and the self-backhauling base station and the destination evolved NodeB negotiate the setup of the GTP tunnel 4: the destination evolved NodeB newly sets up a mapping relation in the tunnel mapping table, referring to table 5;

TABLE 5

| GTP tunnel | Destination transport bearer address |
|---|---|
| 3->4 | Data plane address of a self-backhauling base station |
| 4->3 | Data plane address of a source evolved NodeB |

Where 3->4 denotes from the GTP tunnel 3 to the GTP tunnel 4, and 4->3 denotes from the GTP tunnel 4 to the GTP tunnel 3.

The destination evolved NodeB adopts the same method to set up the tunnel 5 between the destination evolved NodeB and the gateway;

Through the setup of the foregoing three segments of transport bearers, data transport and relay processing may be performed on the source evolved NodeB and the destination evolved NodeB respectively. For example, after receiving the data encapsulated by the self-backhauling base station and sent by the self-backhauling base station, the destination evolved NodeB parses the data encapsulated by the self-backhauling base station, then encapsulates the parsed data according to the tunnel mapping table, and then sends the data to the source evolved NodeB, and after parsing the data encapsulated by the destination evolved NodeB, the source evolved NodeB then encapsulates the parsed data according to its own tunnel mapping table, and then sends the data to the gateway; similarly, after receiving the data encapsulated by the gateway, the source evolved NodeB parses the data encapsulated by gateway, encapsulates the parsed data according to the tunnel mapping table stored by itself, and then sends the data to the destination evolved NodeB, and the destination evolved NodeB parses the data, then re-encapsulates the data and sends the data to the self-backhauling base station; that is to say, in this case, the relay function is completed commonly through the source relay base station and the destination evolved NodeB. By using the method provided in the solution, relative to the processing in the same case in the prior art, not only the overhead may be reduced, but also the packet loss phenomenon of data in the handover procedure may be reduced; thus ensuring that the data transport has high accuracy.

Figure 11:
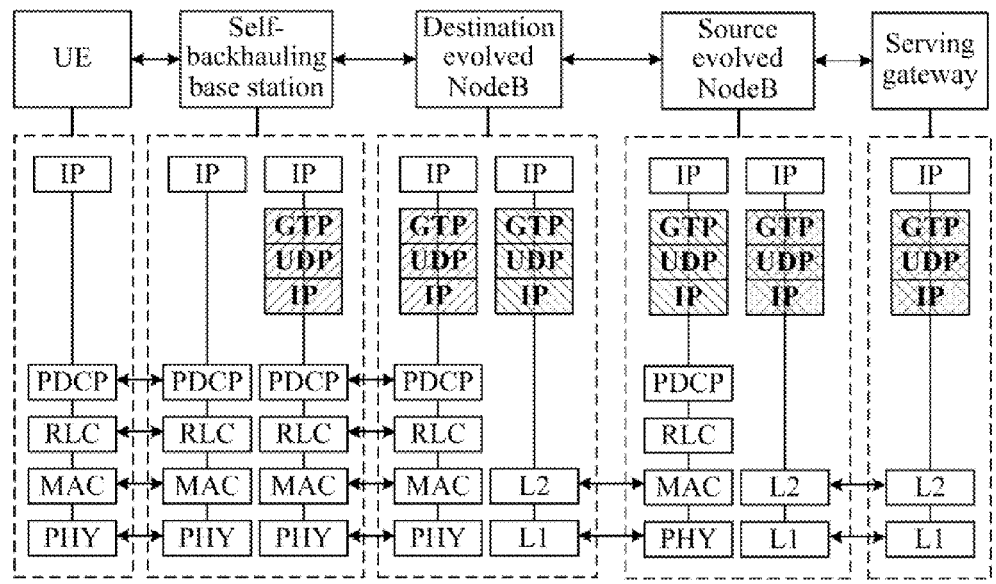
FIG. 11 is a schematic diagram of a protocol stack corresponding to the method according to the fifth embodiment of the present invention.

A specific protocol stack corresponding to the process may be as shown in FIG. 11, and the GTP, the UDP and the IP protocol are taken as an example in the drawing, the transmission protocol between the self-backhauling base station and the destination evolved NodeB is denoted with diagonal shade, the transmission protocol between the destination evolved NodeB and the source evolved NodeB is denoted with vertical line shade, and the transmission protocol between the source evolved NodeB and the S-GW is denoted with mesh shade, where the PDCP, the RLC, the MAC, the PHY, the L2 and the L1 are protocols of other layers, because modification of these protocol layer solutions is not involved in solutions according to the embodiments of the present invention, and is not described in detail here; additionally, it should be noted that for simplicity and convenience of drawing, protocols in the drawing are all denoted with English abbreviation.

It can be seen that, during "in handover", data transport passes through the relay of two evolved NodeBs, where a method for the relay adopts the relay method provided in the embodiment of the present invention.

It can be known from the foregoing that, in this embodiment, when receiving the data encapsulated by the source device and sent by the source device, the relay base station first decapsulates the data, encapsulates the data again, and then sends the encapsulated data to the host device, thus achieving the relay function of the relay base station, and ensuring that the data has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station) is reduced in the transport procedure, a time delay may be reduced. Further, if in the transport procedure, the relay base station is handed over because the self-backhauling base station moves, the relay function provided by the relay base station may be further utilized to implement seamless handover of the relay base station, thus ensuring accuracy of data transfer.

Embodiment 6

Figure 12:
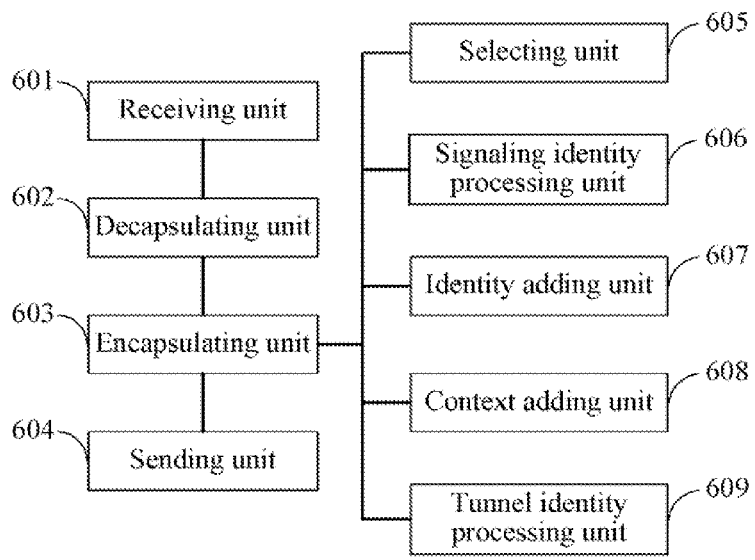
FIG. 12 is a schematic structural diagram of a relay base station according to an embodiment of the present invention.

In order to better implement the foregoing method, an embodiment of the present invention further correspondingly provides a relay base station, and as shown in FIG. 12, the relay base station includes a receiving unit 601, a decapsulating unit 602, an encapsulating unit 603 and a sending unit 604.

The receiving unit 601 is configured to receive information encapsulated by a source device and sent by the source device, where the source device may be a self-backhauling base station, and, a host device may be a gateway; or the source device is a gateway, and the host device is a self-backhauling base station; additionally, the information mentioned there may be a signaling message or data.

The decapsulating unit 602 is configured to decapsulate the information encapsulated by the source device and received by the receiving unit 601.

The encapsulating unit 603 is configured to encapsulate the information decapsulated by the decapsulating unit 602.

The sending unit 604 is configured to send the information encapsulated by the encapsulating unit 603 to the host device.

The receiving unit 601 may include a signaling receiving subunit and a data receiving subunit.

The signaling receiving subunit is configured to receive a signaling message encapsulated by a source device and sent by the source device.

The data receiving subunit is configured to receive data encapsulated by a source device and sent by the source device.

The decapsulating unit 602 may include a signaling decapsulating subunit and a data decapsulating subunit.

The signaling decapsulating subunit is configured to parse the signaling message encapsulated by the source device and received by the signaling receiving subunit.

The data decapsulating subunit is configured to parsed the data encapsulated by the source device and received by the data receiving subunit.

The encapsulating unit 603 may include a signaling encapsulating subunit and a data encapsulating subunit.

The signaling encapsulating subunit is configured to perform address replacement on the signaling message parsed by the signaling decapsulating subunit.

The data encapsulating subunit is configured to perform address replacement on the data parsed by the data decapsulating subunit.

The sending unit 604 may include a signaling sending subunit and a data sending subunit.

The signaling sending subunit is configured to send the signaling message replaced by the signaling encapsulating subunit to the host device.

The data sending subunit is configured to send the data replaced by the data encapsulating subunit to the host device.

As shown in FIG. 12, the relay base station may further include a selecting unit 605.

The selecting unit 605 is configured to select a gateway for a self-backhauling base station.

The signaling encapsulating subunit is configured to perform, according to the gateway selected by the selecting unit 605, address replacement on the signaling message decapsulated by the signaling decapsulating subunit.

As shown in FIG. 12, the relay base station may further include a signaling identity processing unit 606.

The signaling identity processing unit 606 is configured to perform signaling identity replacement on the signaling message parsed by the signaling decapsulating subunit.

The signaling identity processing unit 606 may include a signaling mapping table setup subunit and a signaling identity replacement subunit.

The signaling mapping table setup subunit is configured to set up a signaling identity pair mapping table.

The signaling identity replacement subunit is configured to perform signaling identity replacement on the parsed signaling message according to the signaling identity pair mapping table set up by the signaling mapping table setup subunit.

As shown in FIG. 12, the relay base station may further include an identity adding unit 607.

The identity adding unit 607 is configured to add an identity denoting that relay processing is performed, and/or add a self-backhauling base station identity to the signaling message parsed by the signaling decapsulating subunit, so that the gateway processes the received information according to the identity denoting that the relay processing is performed and/or the self-backhauling base station identity.

As shown in FIG. 12, the relay base station may further include a context adding unit 608.

The context adding unit 608 is configured to add content of the signaling message parsed by the signaling decapsulating subunit to stored context information of the self-backhauling base station or gateway.

As shown in FIG. 12, the relay base station may further include a tunnel identity processing unit 609.

The tunnel identity processing unit 609 is configured to perform data tunnel identity replacement on the data parsed by the data decapsulating subunit.

The tunnel identity processing unit 609 may include a data mapping table setup subunit and a tunnel identity replacement subunit.

The data mapping table setup subunit is configured to set up a tunnel mapping table.

It should be noted that, if the self-backhauling base station is movable, the self-backhauling base station may be handed over between different relay base stations, in this case, if it is in handover, with respect to the source relay base station, the destination relay base station is equivalent to a self-backhauling base station, and a mapping table set up by the source relay base station is a tunnel mapping table between the destination relay base station and a gateway; while with respect to the destination relay base station, the source relay base station is equivalent to a gateway, a tunnel mapping table set up by the destination relay base station is a tunnel mapping table between the self-backhauling base station and the source relay base station; if it is after handover, a tunnel mapping table set up by the destination relay base station is a tunnel mapping table between the self-backhauling base station and a gateway.

The tunnel identity replacement subunit is configured to perform tunnel identity replacement on the parsed data according to the tunnel mapping table set up by the data mapping table setup subunit.

Reference may be made to the previous embodiments for specific implementations of the foregoing units, which are not repeatedly described here.

It can be known from the foregoing that, the relay base station in this embodiment adopts the following steps: when the receiving unit 601 receives information encapsulated by the source device and sent by the source device, the decapsulating unit 602 first decapsulates the information, then the encapsulating unit 603 encapsulates the information again, and then the sending unit 604 sends the information to the host device, thus achieving the relay function of the relay base station, and ensuring that the information has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station) is reduced in the transport procedure, a time delay may be reduced. Further, if in the transport procedure, the relay base station is handed over because the self-backhauling base station moves, the relay function provided by the relay base station may be further utilized to implement seamless handover of the relay base station, thus ensuring accuracy of data transfer.

Embodiment 7

Figure 13:
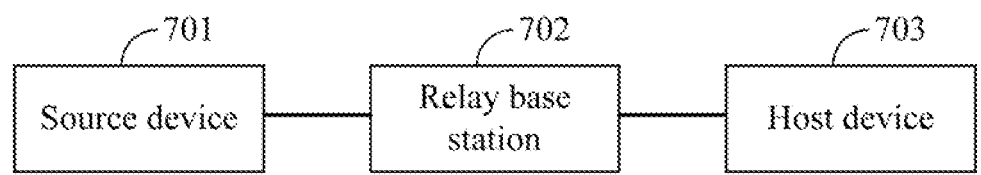
FIG. 13 is a schematic structural diagram of a communication system according to an embodiment of the present invention.

Correspondingly, an embodiment of the present invention further provides a communication system, and as shown in FIG. 13, the communication system includes a source device 701, any relay base station 702 and host device 703 that are provided in the embodiments of the present invention.

The source device 701 is configured to encapsulate information required to be sent to the host device 703 and send the encapsulated information to the relay base station 702, where the information mentioned here may be a signaling message or data.

The relay base station 702 is configured to receive the information encapsulated by the source device 701 and sent by the source device 701, decapsulate the information encapsulated by the source device 701, encapsulate the decapsulated information, and send the encapsulated information to the host device 703.

The host device 703 is configured to receive the encapsulated information sent by the relay base station 702.

The relay base station may specifically be an evolved NodeB, and the source device 701 may specifically be a self-backhauling base station; correspondingly, the host device 703 specifically is a gateway, such as an MME or an S-GW; or, the source device 701 specifically is a gateway, such as an MME or an S-GW, and correspondingly, the host device 703 specifically is a self-backhauling base station.

Further, the relay base station 702 is further configured to select a gateway for a self-backhauling base station.

Additionally, if the self-backhauling base station is movable, the self-backhauling base station may be handed over between different relay base stations 702; therefore, when the relay base station 702 is used as a source relay base station, the relay base station 702 is further configured to send, to the destination relay base station, a handover request of handing over from the relay base station 702 to a destination relay base station, where the handover request carries an address of the source relay base station and a gateway address; and d receive a response message denoting consent, where the response message denoting consent is returned by the destination relay base station and carries an address of the destination relay base station, and encapsulates the information decapsulated by the gateway, change the source address of the decapsulated information to an address of the relay base station 702, change the destination address to an address of the destination relay base station, and then send the changed information to the destination relay base station, so that the destination relay base station relays the changed information to the self-backhauling base station. When the relay base station 702 is used as the destination relay base station, the relay base station 702 is further configured to receive a handover request of handing over from the source relay base station to the relay base station 702, where the handover request is sent by the source relay base station, and the handover request carries an address of the source relay base station and a gateway address; and return a response message denoting consent, where the response message denoting consent carries an address of the relay base station 702, to the source relay base station, and decapsulate the information encapsulated by the self-backhauling base station, change the source address of the decapsulated information to an address of the relay base station 702, change the destination address to an address of the source relay base station, and then send the changed information to the source relay base station, so that the source relay base station relays the changed information to the gateway. Reference may be made to the fifth embodiment for details.

Reference may be made to the previous embodiments for specific implementations of the foregoing devices, which are not repeatedly described here.

It can be known from the foregoing that, in this embodiment, when receiving the data encapsulated by the source device 701 and sent by the source device 701, the relay base station 702 first decapsulates the data, encapsulates the data again, and then sends the encapsulated data to the host device 703, thus achieving the relay function of the relay base station 702, and ensuring that the data has only a layer of encapsulation in the transport procedure, so as to avoid a case that a high overhead caused by two layers of encapsulation occurs in the transport procedure, and compared with the prior art, the overhead in the transport procedure may be reduced, and the transport efficiency may be increased. Furthermore, because processing of a node (the gateway of the relay base station 702) is reduced in the transport procedure, a time delay may be reduced. Further, if in the transport procedure, the relay base station 702 is handed over because the self-backhauling base station moves, the relay function provided by the relay base station may be further utilized to implement seamless handover of the relay base station, thus ensuring accuracy of data transfer.

Persons of ordinary skill in the art may understand that all or part of the steps of the method according to the foregoing embodiments may be implemented by a program instructing relevant hardware. The program may be stored in a computer readable storage medium. The storage medium may be a read-only memory (ROM, Read Only Memory), a random access memory (RAM, Random Access Memory), a magnetic disk or an optical disk.

The relay method of a transport bearer, the apparatus and the communication system according to the embodiments of the present invention are introduced in detail above. Specific cases are used for illustrating principles and implementation manners of the present invention. The foregoing descriptions of the embodiments are merely used to help understand the method and core ideas of the present invention. Meanwhile, persons of ordinary skill in the art may make modifications to the specific implementation manners and application scopes according to the idea of the present invention. In conclusion, the contents of the specification shall not be regarded as limitations to the present invention.

What is claimed is:

1. A relay method of a transport bearer, comprising:
   receiving information encapsulated by a source device and sent by the source device;
   decapsulating the received information encapsulated by the source device;
   encapsulating the decapsulated information; and
   sending the encapsulated information to a host device;
   wherein the receiving the information encapsulated by the source device and sent by the source device comprises: receiving a signaling message or data, wherein the signaling message or data is encapsulated by the source device and sent by the source device;
   the decapsulating the received information encapsulated by the source device comprises: parsing the received signaling message or data, wherein the received signaling message or data is encapsulated by the source device;
   the encapsulating the decapsulated information comprises: performing signaling bearer address replacement on the parsed signaling message, or performing data bearer address replacement on the parsed data; and
   the sending the encapsulated information to the host device comprises: sending the signaling message after the signaling bearer address replacement to the host device, or sending the data after the data bearer address replacement to the host device.

2. The method according to claim 1, wherein the source device is a self-backhauling base station, and the host device is a gateway; or the source device is a gateway, and the host device is a self-backhauling base station.

3. The method according to claim 1, wherein when the source device is a self-backhauling base station, and the host device is a gateway, after the parsing the received signaling message encapsulated by the source device, the method further comprises:
   selecting a gateway for the self-backhauling base station; and
   the performing the address replacement on the parsed signaling message comprises: performing the signaling bearer address replacement on the parsed signaling message according to the selected gateway.

4. The method according to claim 1, wherein the encapsulating the decapsulated information further comprises:
   performing signaling identity replacement on the parsed signaling message; or
   performing data tunnel identity replacement on the parsed data.

5. The method according to claim 1, wherein the performing the signaling identity replacement on the parsed signaling message comprises:
   setting up a signaling identity pair mapping table, and performing the signaling identity replacement on the parsed signaling message according to the signaling identity pair mapping table; and the performing the data tunnel identity replacement on the parsed data packet comprises:
setting up a tunnel mapping table, and performing tunnel identity replacement on the parsed data according to the tunnel mapping table.

6. The method according to claim 5, wherein when the relay base station needs to be handed over, the setting up the tunnel mapping table comprises:
in handover, setting up a tunnel mapping table between the self-backhauling base station and a source relay base station; and
after the handover, setting up a tunnel mapping table between the self-backhauling base station and a gateway.

7. The method according to claim 1, wherein when the source device is a self-backhauling base station, and the host device is a gateway, after the parsing the received information encapsulated by the source device, the method further comprises:
adding an identity denoting that relay processing is performed, and/or adding a self-backhauling base station identity to the parsed signaling message, so that the gateway processes the received information according to the identity denoting that the relay processing is performed and/or the self-backhauling base station identity.

8. The method according to claim 1, wherein when the source device is a gateway, and the host device is a self-backhauling base station, the receiving the information encapsulated by the source device and sent by the source device comprises:
receiving a signaling message encapsulated by the gateway and sent by the gateway, wherein the signaling message encapsulated by the gateway carries a self-backhauling base station identity; and
the encapsulating the decapsulated information comprises:
encapsulating the parsed signaling message according to the self-backhauling base station identity.

9. The method according to claim 1, wherein after the parsing the received signaling message encapsulated by the source device, the method further comprises:
adding content of the parsed signaling message to stored context information of the self-backhauling base station or the gateway.

10. A relay base station, comprising:
a receiving unit, configured to receive information encapsulated by a source device and sent by the source device;
a decapsulating unit, configured to decapsulate the information encapsulated by the source device and received by the receiving unit;
an encapsulating unit, configured to encapsulate the information decapsulated by the decapsulating unit;
a sending unit, configured to send the information encapsulated by the encapsulating unit to a host device: and
a selecting unit, wherein the selecting unit is configured to select a gateway for a self-backhauling base station; and
the signaling encapsulating subunit is configured to perform, according to the gateway selected by the selecting unit, address replacement on the signaling message decapsulated by the signaling decapsulating subunit.

11. The relay base station according to claim 10, wherein the receiving unit comprises a signaling receiving subunit and a data receiving subunit;
the signaling receiving subunit is configured to receive a signaling message encapsulated by a source device and sent by the source device;
the data receiving subunit is configured to receive data encapsulated by a source device and sent by the source device;
the decapsulating unit comprises a signaling decapsulating subunit and a data decapsulating subunit;
the signaling decapsulating subunit is configured to parse the signaling message encapsulated by the source device and received by the signaling receiving subunit;
the data decapsulating subunit is configured to parse the data encapsulated by the source device and received by the data receiving subunit;
the encapsulating unit comprises a signaling encapsulating subunit and a data encapsulating subunit;
the signaling encapsulating subunit is configured to perform address replacement on the signaling message parsed by the signaling decapsulating subunit;
the data encapsulating subunit is configured to perform address replacement on the data parsed by the data decapsulating subunit;
the sending unit comprises a signaling sending subunit and a data sending subunit;
the signaling sending subunit is configured to send the signaling message replaced by the signaling encapsulating subunit to the host device; and
the data sending subunit is configured to send the data replaced by the data encapsulating subunit to the host device.

12. A relay base station, comprising:
a receiving unit, configured to receive information encapsulated by a source device and sent by the source device;
a decapsulating unit, configured to decapsulate the information encapsulated by the source device and received by the receiving unit;
an encapsulating unit, configured to encapsulate the information decapsulated by the decapsulating unit;
a sending unit, configured to send the information encapsulated by the encapsulating unit to a host device; and
a signaling identity processing unit, wherein
the signaling identity processing unit is configured to perform signaling identity replacement on the signaling message parsed by the signaling decapsulating subunit.

13. A relay base station, comprising:
a receiving unit, configured to receive information encapsulated by a source device and sent by the source device;
a decapsulating unit, configured to decapsulate the information encapsulated by the source device and received by the receiving unit;
an encapsulating unit, configured to encapsulate the information decapsulated by the decapsulating unit;
a sending unit, configured to send the information encapsulated by the encapsulating unit to a host device; and
an identity adding unit, wherein
the identity adding unit is configured to add an identity denoting that relay processing is performed, and/or add a self-backhauling base station identity to the signaling message parsed by the signaling decapsulating subunit, so that the gateway processes the received information according to the identity denoting that the relay processing is performed and/or the self-backhauling base station identity.

14. A relay base station, comprising:
a receiving unit, configured to receive information encapsulated by a source device and sent by the source device;
a decapsulating unit, configured to decapsulate the information encapsulated by the source device and received by the receiving unit;

an encapsulating unit, configured to encapsulate the information decapsulated by the decapsulating unit;
a sending unit, configured to send the information encapsulated by the encapsulating unit to a host device; and
a tunnel identity processing unit, wherein
the tunnel identity processing unit is configured to perform data tunnel identity replacement on the data parsed by the data decapsulating subunit.

* * * * *

UNITED STATES PATENT AND TRADEMARK OFFICE
CERTIFICATE OF CORRECTION

PATENT NO.         : 8,792,410 B2
APPLICATION NO.    : 13/370732
DATED              : July 29, 2014
INVENTOR(S)        : Weimin Chen et al.

It is certified that error appears in the above-identified patent and that said Letters Patent is hereby corrected as shown below:

On the Title Page, item (75) Inventors, line 2, delete "Gauquan" and insert --Gaoquan--.

Signed and Sealed this
Eleventh Day of November, 2014

Michelle K. Lee
*Deputy Director of the United States Patent and Trademark Office*